Patented Jan. 22, 1952

2,583,419

UNITED STATES PATENT OFFICE 2,583,419

PRODUCTION OF ORGANIC TIN COMPOUNDS

Donald Faulkner, Epsom, and John Noel Milne, Epsom Downs, England, assignors to The Distillers Company Limited, Edinburgh, Scotland, a British company No Drawing. Application September 5, 1950, Serial No. 183,287. In Great Britain October 4, 1949

5 Claims. (Cl. 260—429)

This invention relates to the production of trialkyl tin mono-alkoxides in which the alkyl groups each contain not less than four carbon atoms, and the alkoxy group contains from one to eight carbon atoms.

These mono-alkoxides may be prepared by inter-reaction of an alkali metal alkoxide with the corresponding trialkyl tin halide, a procedure closely analogous to the employed process in the production of the dialkyl tin dialkoxides described in British Patent No. 590,734 or United States Patent No. 2,481,086, but the disadvantage of this method is that, unless extremely pure trialkyl tin halide is employed, the product is generally contaminated with the corresponding dialkyl tin dialkoxide.

While the above mentioned dialkyl tin dialkoxides are effective stabilisers for vinyl chloride resins, and their presence would not, for this reason, be expected to be deleterious, they have been found to be hygroscopic and readily hydrolysable and their removal from the monoalkoxides which are intended for use as stabilisers is very desirable.

It has now been found, surprisingly, that the trialkyl tin monoalkoxides defined above are, on the other hand, mobile liquids substantially insensitive to water and dilute aqueous alkaline solutions under mild conditions. Accordingly, the present invention is for a process for the purification of trialkyl tin mono-alkoxides, wherein the alkyl groups each contain not less than four carbon atoms and the alkyl group of the alkoxy radical contains from one to eight carbon atoms, which comprises subjecting said trialkyl tin mono-alkoxide to a washing treatment with water or dilute aqueous alkali. It will be appreciated that if alkali is included in the washing liquid, the washing must be carried out at a relatively low temperature, suitably at room temperature or below, since by their very nature, the compounds concerned may be decomposed by alkalis under severe conditions, for example by heating with strong alkaline solutions to boiling point. The alkali concentrations which may be used vary wthin wide ranges, and concentrations up to 40% weight by volume of alkali may be used, although it has been found that satisfactory results can be obtained with concentrations of the order of 5% weight by volume or less. Suitable alkalis include the hydroxides, carbonates and bicarbonates of the alkali metals, alkaline earth metals and ammonia. In general, when reacting crude trialkyl tin halide with an alkali metal alkoxide, tetra-alkyl tin will be present in addition to dialkyl tin dihalide impurity, and the inert tetra-alkyl compound will remain with the principal reaction product, but it has no deleterious effect on the stabilising action of the monoalkoxide or on polyvinyl chloride compositions containing the latter.

The following examples are given to illustrate the preparation of trialkyl tin mono-alkoxides according to the purification procedure of this invention.

Example 1

11 grams of magnesium turning were covered with 450 ml. of dry ether in a Grignard apparatus, a few ml. of a solution of 62.5 grams of n-butyl bromide in 40 ml. of dry ether were added, and the reaction was started in the usual manner by adding a crystal of iodine and warming gently with vigorous stirring. When the reaction had started, the remainder of the butyl bromide solution was added dropwise with water-cooling during a period of 45 minutes, and the reaction was completed by refluxing for a further half hour.

The flask containing the Grignard solution was then placed in an ice bath and a solution of 100 grams of anhydrous stannic bromide in five times its volume of dry ether was added dropwise during the next hour and a half, a crystalline precipitate separating. Immediately after the addition was completed, the ice bath was replaced by a water bath at 30° C., and stirring was continued for an hour and a half. 45 grams of dry sodium butoxide were then added to the ether solution of butyl tin bromides in several portions, the addition taking about 5 minutes. Stirring was continued for two hours at 30° C. and the reaction was completed by refluxing for one hour and allowing to stand over-night.

The ether solution of the butyl tin butoxides was filtered from the sticky precipitate and the resulting clear solution again deposited a small quantity of solid, probably arising from decomposition of dibutyl tin dibutoxide by atmospheric moisture. This was filtered off, and the filtrate was shaken with 250 ml. of chilled aqueous 5% weight/volume sodium hydroxide, a further quantity of solid precipitating. The ether layer was then separated, washed three times with distilled water, dried over magnesium sulphate and freed from ether by warming on a water bath. Distillation of the residue under 2.5 mm. Hg pressure gave a main 114–127° C. fraction free from dialkoxide in a yield of 14 grams, the refractive index 1.4726 being intermediate between the $n_D^{20}$ 1.4685 of pure tributyl tin mono-butoxide and the $n_D^{20}$ 1.4749 of tetrabutyl tin.

*Example 2*

0.3 gram of clean sodium was dissolved in 15 ml. of dry methyl alcohol and to the solution while still warm was rapidly added a solution of 4.09 grams of trioctyl tin chloride in 10 ml. of dry methyl alcohol. The mixture was stirred for 5½ hours at room temperature and allowed to stand for three days. The reaction product was filtered free from sodium chloride and the methyl alcohol removed therefrom by distillation under slightly reduced pressure. The pasty distillation residue was purified by shaking with 15 ml. of water and the insoluble oil remaining extracted into 80 ml. of light petroleum, the extract washed with water and dried over anhydrous magnesium sulphate. The dried extract was freed from the petroleum solvent by distillation leaving the colourless, odourless liquid trioctyl tin monomethoxide, which is insoluble in water and alcohol and has a refractive index of $n_D^{20}$ 1.4781.

It will be appreciated that the water-washing process of this invention can be applied to any sample of trialkyl tin mono-alkoxide, as defined above, which contains the dialkoxide as impurity, and is not restricted to products prepared as described in the examples.

We claim:

1. A process for the purification of trialkyl tin mono-alkoxide, wherein the alkyl groups each contain not less than four carbon atoms and the alkyl group of the alkoxy radical contains from one to eight carbon atoms, contaminated with dialkyl tin dialkoxide which comprises subjecting said trialkyl tin mono-alkoxide, contaminated with dialkyl tin dialkoxide, to a washing treatment with a mild washing agent selected from the group consisting of water and dilute aqueous alkali.

2. A process as claimed in claim 1, wherein the washing treatment is carried out using dilute sodium hydroxide.

3. A process as claimed in claim 1, wherein the washing treatment is carried out at normal temperatures.

4. A process as claimed in claim 1, wherein said trialkyl tin mono-alkoxide is obtained by reacting the corresponding crude trialkyl tin halide prepared by a Grignard reaction with an alkali metal alkoxide.

5. A process for the preparation of trialkyl tin mono-alkoxide wherein the alkyl groups each contain not less than four carbon atoms and the alkyl group of the alkoxy radical contains from one to eight carbon atoms which comprises reacting the corresponding trialkyl tin halide with the corresponding alkali metal alkoxide and subjecting the product to a washing treatment with a mild washing agent selected from the group consisting of water and dilute aqueous alkali.

DONALD FAULKNER.
JOHN NOEL MILNE.

REFERENCES CITED

The following references are of record in the file of this patent:

UNITED STATES PATENTS

| Number | Name | Date |
|---|---|---|
| 2,481,086 | Cleverdon | Sept. 6, 1949 |

OTHER REFERENCES

Krause et al.: Die Chemie Der Metall-Organischen Verbindungen, page 328.